US009668518B2

(12) United States Patent
Esses

(10) Patent No.: US 9,668,518 B2
(45) Date of Patent: Jun. 6, 2017

(54) MOBILE DEVICE CASE INCLUDING ELECTRONIC CIGARETTES AND ACCESSORIES

(71) Applicant: PREMIER ACCESSORY GROUP, LLC, Edison, NJ (US)

(72) Inventor: Alfred Esses, Brooklyn, NY (US)

(73) Assignee: PREMIER ACCESSORY GROUP, LLC, Edison, NJ (US)

( * ) Notice: Subject to any disclaimer, the term of this patent is extended or adjusted under 35 U.S.C. 154(b) by 481 days.

(21) Appl. No.: 14/230,725

(22) Filed: Mar. 31, 2014

(65) Prior Publication Data

US 2015/0272215 A1     Oct. 1, 2015

(51) Int. Cl.
*H02J 7/00*     (2006.01)
*A24F 47/00*    (2006.01)
*A24F 15/18*    (2006.01)

(52) U.S. Cl.
CPC ............ *A24F 47/008* (2013.01); *A24F 15/18* (2013.01); *H02J 7/0044* (2013.01); *H02J 7/0047* (2013.01); *H02J 7/0054* (2013.01); *H02J 2007/005* (2013.01)

(58) Field of Classification Search
CPC ....................................................... Y02E 60/12
USPC ........................................................... 320/103
See application file for complete search history.

(56) References Cited

U.S. PATENT DOCUMENTS

| 3,960,270 A  * | 6/1976 | May      | B65D 25/04 |
|                |        |          | 206/256    |
| 9,041,342 B2 * | 5/2015 | Dickson  | H01M 6/52  |
|                |        |          | 320/104    |
| 2011/0195753 A1 | 8/2011 | Mock | |
| 2012/0177967 A1 | 7/2012 | Wang | |
| 2013/0206614 A1 | 8/2013 | O'Neil | |
| 2013/0220847 A1* | 8/2013 | Fisher | B65D 25/005 |
|                  |        |        | 206/216 |
| 2013/0273983 A1 | 10/2013 | Hsu | |
| 2014/0305820 A1* | 10/2014 | Xiang | A24F 15/18 |
|                  |         |       | 206/236 |
| 2015/0101940 A1* | 4/2015 | Ash | H04M 1/21 |
|                  |        |     | 206/216 |
| 2015/0215439 A1* | 7/2015 | Stanimirovic | H04M 1/215 |
|                  |        |              | 455/572 |
| 2016/0080535 A1* | 3/2016 | Stanimirovic | H04M 1/0249 |
|                  |        |              | 455/575.8 |

FOREIGN PATENT DOCUMENTS

| CN | 202475509 U | 10/2012 | |
| WO | WO 2007041956 A1 * | 4/2007 | ............. H04M 1/21 |
| WO | WO 2014125469 A1 * | 8/2014 | ............. F23Q 7/16 |

* cited by examiner

*Primary Examiner* — Suresh Memula
(74) *Attorney, Agent, or Firm* — Moritt Hock & Hamroff LLP; Steven S. Rubin, Esq.

(57) ABSTRACT

Technologies are generally described for systems, devices, and methods effective to receive a battery of an electronic cigarette in a mobile device case. A mobile device may be received in a first portion of the mobile device case in such a way that the mobile device is accessible to a user. The battery of the electronic cigarette may be received in a compartment of a second portion of the mobile device case. The compartment may be formed by one or more walls of the mobile device case. The first portion of the mobile device case may be contiguous with the second portion of the mobile device case.

20 Claims, 4 Drawing Sheets

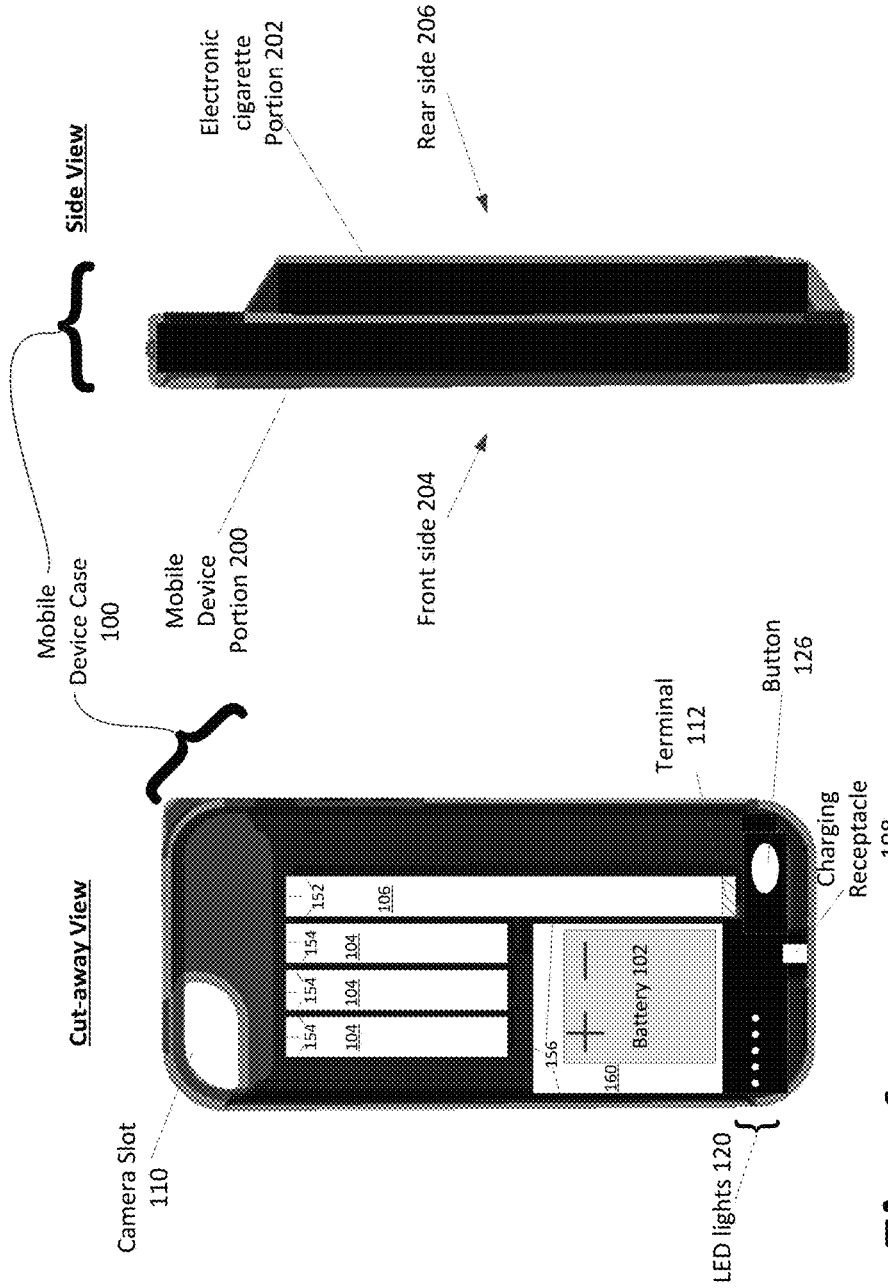

MOBILE DEVICE CASE INCLUDING ELECTRONIC CIGARETTES AND ACCESSORIES

BACKGROUND

Unless otherwise indicated herein, the materials described in this section are not prior art to the claims in this application and are not admitted to be prior art by inclusion in this section.

Mobile devices may include cell phones, smart phones, PDAs, tablets and/or other portable devices. Mobile device cases may be designed to protect a mobile device from damage. Mobile device cases may surround the mobile device and may be designed so that functionality of the mobile device is not impeded.

SUMMARY

In some examples, cases for mobile devices are generally described. The cases may include a mobile device portion configured to hold a mobile device in such a way that the mobile device is accessible to a user. In various other examples, the cases may include an electronic cigarette portion contiguous with the mobile device portion. In some examples, the electronic cigarette portion may include one or more walls positioned and arranged so as to form a compartment to hold a battery of an electronic cigarette. In various examples, the compartment may include a terminal. The electronic cigarette portion may further include a recharging battery. The electronic cigarette portion may further include a circuit. In some examples, the circuit may be configured to couple the recharging battery to the terminal.

In some examples, cases for mobile devices are generally described. The cases may include a mobile device portion configured to hold a mobile device in such a way that the mobile device is accessible to a user. In various other examples the cases may include an electronic cigarette portion contiguous with the mobile device portion. In some examples the electronic cigarette portion may include one or more walls positioned and arranged so as to form one or more compartments. In various examples the one or more compartments may be configured to hold at least one of an electronic cigarette, an accessory for the electronic cigarette and a battery of the electronic cigarette. In other examples, the electronic cigarette portion may include the electronic cigarette, a recharging battery, and/or a circuit. In some examples, the circuit may be configured to couple the recharging battery to a terminal in at least one of the one or more compartments.

In some examples, methods for receiving a battery of an electronic cigarette in a mobile device case are generally described. The methods may include receiving a mobile device in a first portion of the mobile device case in such a way that the mobile device is accessible to a user. In other examples, the methods may include receiving the battery of the electronic cigarette in a compartment of a second portion of the mobile device case. In various examples, the compartment may be formed by one or more walls of the mobile device case. In still other examples, the first portion of the mobile device case may be contiguous with the second portion of the mobile device case.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 illustrates an example a front cut-away view of an example mobile device case;

FIG. 2 illustrates an example side view of mobile device case;

Figure 3:
FIG. 3 illustrates a front perspective, cut-away view of mobile device case, depicted from an angle.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and devices, related to a mobile device case including an electronic cigarette accessory holder.

FIG. 1 illustrates a front cut-away view of an example mobile device case 100. FIG. 2 illustrates a side view of example mobile device case 100. Mobile device case 100 may include mechanisms effective to hold and/or receive electronic cigarette accessories and/or electronic cigarettes in accordance with at least some embodiments described herein. Mobile device case 100 may include a mobile device portion 200 and an electronic cigarette portion 202. In an example, mobile device portion 200 and electronic cigarette portion 202 may be contiguous with one another. Mobile device portion 200 may receive a mobile device in such a way that the mobile device may be accessible to a user. Some examples of mobile devices may include smart phones, tablets, electronic readers, and/or other portable electronic devices. Mobile device portion 200 may be configured to surround and protect a compatible mobile device. Electronic cigarette portion 202 may be configured to receive and/or store a recharging battery 102, one or more electronic cigarettes, one or more batteries of electronic cigarettes, and/or one or more e-cigarette accessories.

Mobile device case 100 or walls of mobile device case 100 may be positioned and/or arranged so as to form ports, holes or other openings to allow access to input/output ports of a mobile device designed to be used with mobile device case 100. In an example, walls of mobile device case 100 may be positioned and/or arranged to form camera slot 110. Camera slot 110 may allow a camera of a mobile device to take pictures without being obscured by mobile device case 100.

One or more walls 154 of mobile device case 100 may be positioned and/or arranged to form one or more compartments 104. In some examples, walls 154 may form a cylindrical, parallelepiped, or other shape of compartments 104. Compartments 104 may be located in electronic cigarette portion 202 of mobile device case 100. Compartments 104 may be configured to hold one or more electronic cigarette accessories such as, for example, electronic cigarette cartridges, nicotine packets, flavor caps, etc. For example, cartridges for an electronic cigarette may provide different flavors and/or different amounts of nicotine.

One or more walls 152 of mobile device case 100 may define an electronic cigarette battery compartment 106. In some examples, walls 152 may form a cylindrical, parallelepiped, or other shape of e-cigarette battery compartment 106. Electronic cigarette battery compartment 106 may be a compartment configured to hold a battery for an electronic cigarette. Electronic cigarette battery compartment 106 may be located in electronic cigarette portion 202 of mobile device case 100. In an example, electronic cigarette battery compartment 106 may be configured to store one or more electronic cigarette batteries. In a further example, electronic cigarette battery compartment 106 may be configured to hold and/or store an electronic cigarette together with a battery for the electronic cigarette, as a single unit. For example, the electronic cigarette battery may be attached to the electronic cigarette while stored in electronic cigarette battery compartment 106. Walls 152 may include a terminal 112. Terminal 112 may be a contact configured to allow for the flow of electric charge. In an example, terminal 112 may be configured to conduct electric current which may flow into an electronic cigarette battery stored in electronic cigarette battery compartment 106. In the example, the electric current may recharge an electronic cigarette battery stored in electronic cigarette battery compartment 106. In another example, terminal 112 may be electrically coupled through circuitry to a recharging battery 102. In another example, terminal 112 may be electrically coupled through circuitry to a charging receptacle 108. Charging receptacle 108 may be an interface for a phone charger, A/C adapter, external battery and/or other charging unit.

Recharging battery 102 may be a rechargeable battery such as, for example, a Nickel-cadmium battery, a nickel-metal hydride battery, a lithium-ion battery, a lithium-ion polymer battery, or another type of rechargeable battery. Recharging battery 102 may be held and/or stored in recharging battery compartment 160. One or more walls 156 of mobile device case 100 may define a recharging battery compartment 160. In some examples, walls 156 may form a cylindrical, parallelepiped, or other shape of recharging battery compartment 160. Recharging battery compartment 160 may be a compartment configured to hold recharging battery 102. Recharging battery compartment 160 may be located in electronic cigarette portion 202 of mobile device case 100. In an example, recharging battery 102 may be electrically coupled to terminal 112 of electronic cigarette battery compartment 106, such as by a circuit. In the example, recharging battery 102 may be configured to charge an electronic cigarette battery through terminal 112 of electronic cigarette battery compartment 106. In another example, recharging battery 102 may be configured to recharge a battery of a mobile device designed for use with mobile device case 100. For example, mobile device case 100 may be designed for a smart phone. In the example, recharging battery 102 may be configured to recharge the battery of the smart phone. In some examples, a user may control recharging battery 102 to charge the battery of a mobile device and/or a battery of an electronic cigarette by activating a switch, depressing a button 126 or through a user interface of the mobile device. For example, depressing button 126 may activate recharging battery 102 to charge an electronic cigarette battery in electronic cigarette battery compartment 106.

Recharging battery 102 may be recharged through charging receptacle 108 by, for example, a power adapter. Although depicted in FIG. 1 as being located below compartments 104, recharging battery 102 may be located anywhere within mobile device case 100. In an example, one or more LED lights 120 of mobile device case 100 may indicate a level of charge for recharging battery 102. For example, all lights of LED lights 120 may be illuminated if recharging battery 102 has a full charge. For example, a circuit may use voltage divider resistors to supply reference voltages to the inverting inputs of one or more comparators. Recharging battery 102 may be coupled to the non-inverting input of the one or more comparators. The output of each comparator may be coupled to an LED. If the voltage of recharging battery 102 exceeds the reference voltage, the output of the corresponding comparator will be high and the coupled LED may glow. In another example, if no lights of LED lights 120 are illuminated, recharging battery 102 may hold no charge. Other indicators of a level of charge for recharging battery 102 may include different colors of LED lights 120 and/or an indication by a user interface of a mobile device used with mobile device case 100.

FIG. 3 illustrates a side perspective, cut-away view of mobile device case 100, depicted from an angle, arranged in accordance with at least some embodiments described herein. Mobile device case 100 may include a port 302. Mobile device case 100 or walls of mobile device case 100 may form a port 302. Port 302 may allow access to an input/output port or power port of a compatible mobile device. In some examples, compartment 104 and/or e-cigarette battery compartment 106 may be accessible through front side 204 and/or rear side 206 of mobile device case 100.

Figure 4:
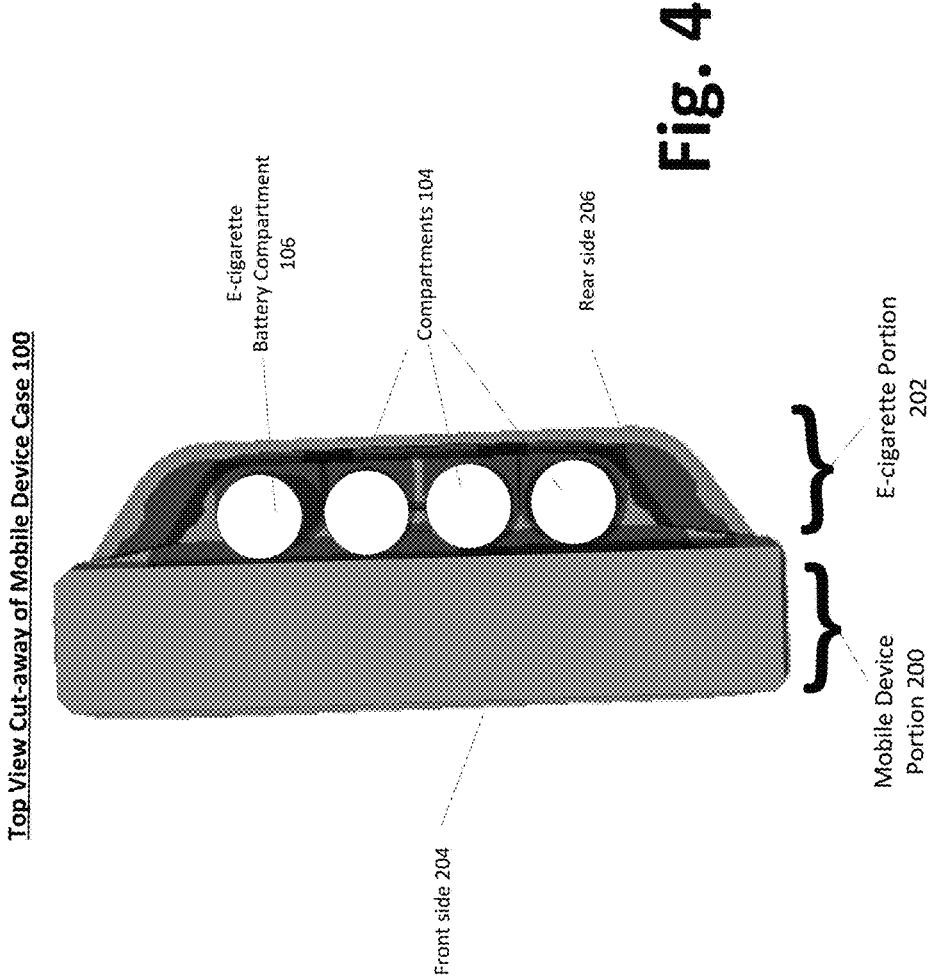
FIG. 4 illustrates a top cut-away view of a mobile device case, arranged in accordance with at least some embodiments described herein.

FIG. 4 illustrates a top cut-away view of mobile device case 100, arranged in accordance with at least some embodiments described herein. Mobile device case 100 may be formed in such a way as to securely fit a compatible mobile device. In an example, mobile device case 100 may be designed according to specifications provided by a manufacturer of a particular mobile device.

Figure 5:
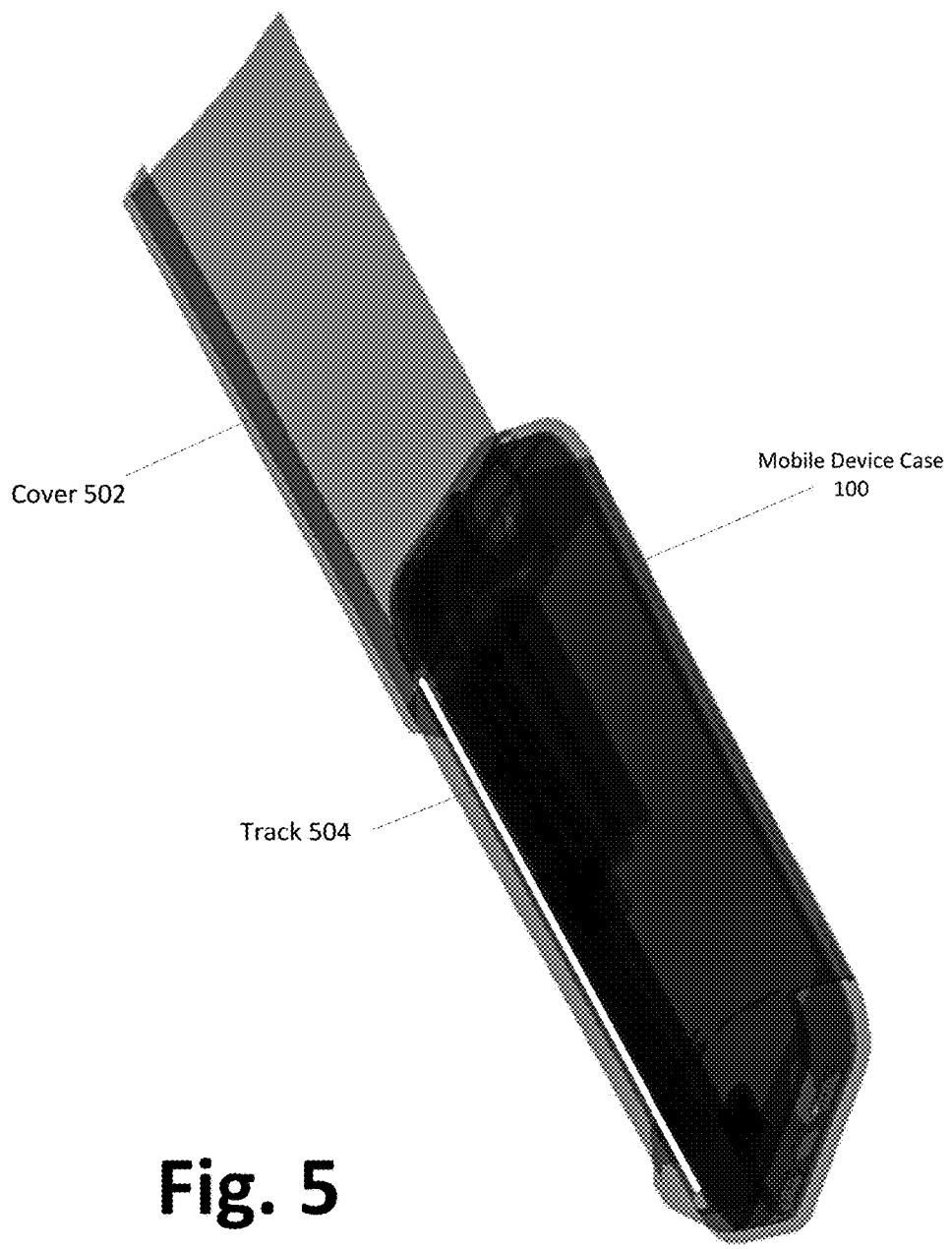
FIG. 5 illustrates a perspective, cut-away view of mobile device case, depicted from a side perspective.

FIG. 5 illustrates a perspective, cut-away view of mobile device case 100, depicted from a different angle, arranged in accordance with at least some embodiments described herein. Mobile device case 100 may include a cover 502. In an example, cover 502 may be configured to cover recharging battery 102, compartments 104 and/or e-cigarette battery compartment 106 depicted in FIGS. 1-4. Cover 502 may be configured to slide upwards or downwards along, for example, a track 504 to provide access to one or more of recharging battery 102, compartments 104 and/or e-cigarette battery compartment 106.

Among other benefits, a mobile device case in accordance with the disclosure may allow a user to store an electronic cigarette and/or electronic cigarette accessories within the case of a mobile device, such as, for example, a smart phone. Additionally, the mobile device case may include a rechargeable battery. The rechargeable battery may be effective to recharge a battery of an electronic cigarette. Additionally, the rechargeable battery may be effective to recharge a battery of a mobile device which may be protected by the mobile device case.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A case for a mobile device, the case comprising:
    a mobile device portion configured to hold a mobile device so as to allow access to input/output ports of the mobile device; and
    an electronic cigarette portion contiguous with the mobile device portion, the electronic cigarette portion including:
        one or more walls positioned and arranged so as to form a compartment to hold a battery of an electronic cigarette, wherein the compartment includes a terminal;
        a recharging battery; and
        a circuit configured to couple the recharging battery to the terminal.

2. The case of claim 1, wherein the recharging battery is configured to charge the battery of the electronic cigarette through the circuit.

3. The case of claim 1, wherein the recharging battery is configured to charge a mobile device battery through the circuit.

4. The case of claim 1, further comprising a cover of the mobile device case, wherein the cover is configured to slide along a track of the mobile device case to cover the compartment and the recharging battery.

5. The case of claim 1, further comprising a button of the mobile device case, wherein depressing the button closes the circuit so that the recharging battery charges the battery of the electronic cigarette through the circuit.

6. The case of claim 1, further comprising one or more LED lights in the case, wherein the LED lights are configured to indicate a level of charge for the recharging battery.

7. The case of claim 1, wherein the compartment is a first compartment of a first size, and wherein the one or more walls are positioned and arranged to form a second compartment of a second size, wherein the first compartment is configured to hold an electronic cigarette and the second compartment is configured to hold an accessory for the electronic cigarette.

8. The case of claim 7, wherein the accessory for the electronic cigarette includes at least one of a nicotine supplement, a cartridge, and a flavor cap.

9. A case for a mobile device, the case comprising:
    a mobile device portion configured to hold a mobile device so as to allow access to input/output ports of the mobile device; and
    an electronic cigarette portion contiguous with the mobile device portion, including:
        one or more walls positioned and arranged so as to form one or more compartments, wherein at least on compartment is configured to hold a battery of an electronic cigarette;
        a recharging battery; and
        a circuit configured to couple the recharging battery to a terminal in at least one of the one or more compartments.

10. The case of claim 9, wherein the recharging battery is configured to charge the battery of the electronic cigarette through the circuit.

11. The case of claim 10, wherein the recharging battery is further configured to charge a mobile device battery.

12. The case of claim 9, further comprising a cover of the mobile device case, wherein the cover is configured to slide along a track of the mobile device case to cover the one or more compartments and the recharging battery.

13. The case of claim 9, further comprising a button of the mobile device case, wherein depressing the button closes the circuit so that the recharging battery charges the battery of the electronic cigarette through the circuit.

14. The case of claim 9, further comprising one or more LED lights in the case, wherein the LED lights are configured to indicate a level of charge for the recharging battery.

15. The case of claim 9, wherein the one or more walls are positioned and arranged to form at least a first compartment of a first size and a second compartment of a second size, wherein the first compartment is configured to hold the battery of the electronic cigarette and the second compartment is configured to hold the accessory for the electronic cigarette.

16. The case of claim 9, wherein the accessory for the electronic cigarette includes at least one of a nicotine supplement, a cartridge, and a flavor cap.

17. A method for receiving a battery of an electronic cigarette in a mobile device case, the method comprising:
    receiving a mobile device in a first portion of the mobile device case so as to allow access to input/output ports of the mobile device; and
    receiving the battery of the electronic cigarette in a compartment of a second portion of the mobile device case, wherein the compartment is formed by one or more walls of the mobile device case, the compartment is configured to hold the battery of the electronic cigarette, the compartment includes a terminal which is configured to allow electric current to flow into the battery of the electronic cigarette, and wherein the first portion of the mobile device case is contiguous with the second portion of the mobile device case.

18. The method of claim 17, further comprising charging the battery of the electronic cigarette with a recharging battery of the case coupled through a circuit to the terminal.

19. The method of claim 17, further comprising charging a battery of the mobile device with a recharging battery of the case.

20. The method of claim 17, wherein the compartment is a first compartment, and further comprising:
    receiving an accessory for the electronic cigarette in a second compartment of the mobile device case.

* * * * *